United States Patent
Kim et al.

(10) Patent No.: US 10,026,520 B2
(45) Date of Patent: Jul. 17, 2018

(54) POSITIVE ELECTRODE ACTIVE MATERIAL FOR SECONDARY BATTERY

(71) Applicants: SK INNOVATION CO., LTD., Seoul (KR); UNIST ACADEMY-INDUSTRY RESEARCH CORPORATION, Ulsan (KR)

(72) Inventors: Jeong Soo Kim, Daejeon (KR); Young Shol Kim, Daejeon (KR); Je Hyun Chae, Daejeon (KR); Hee Young Sun, Daejeon (KR); Kyu Tae Lee, Ulsan (KR); Seung Hee Woo, Guri-si (KR); Kwang Ho Ha, Daegu (KR)

(73) Assignees: SK Innovation Co., Ltd., Seoul (KR); UNIST (Ulsan National Institute of Science and Technology), Ulsan (KR)

( * ) Notice: Subject to any disclaimer, the term of this patent is extended or adjusted under 35 U.S.C. 154(b) by 199 days.

(21) Appl. No.: 14/904,237

(22) PCT Filed: Aug. 16, 2013

(86) PCT No.: PCT/KR2013/007398
§ 371 (c)(1),
(2) Date: Jan. 11, 2016

(87) PCT Pub. No.: WO2015/023017
PCT Pub. Date: Feb. 19, 2015

(65) Prior Publication Data
US 2016/0164095 A1 Jun. 9, 2016

(51) Int. Cl.
*H01B 1/06* (2006.01)
*C01B 25/42* (2006.01)
(Continued)

(52) U.S. Cl.
CPC ............ *H01B 1/06* (2013.01); *C01B 25/42* (2013.01); *H01M 4/5825* (2013.01); *H01M 10/054* (2013.01)

(58) Field of Classification Search
CPC . H01B 1/06; H01M 4/48; H01M 4/58; H01M 4/5825; H01M 10/054;
(Continued)

(56) References Cited

U.S. PATENT DOCUMENTS 7,008,566 B2 *  3/2006  Barker ................. H01B 1/08
                                                          252/518.1
2011/0008233 A1  1/2011  Miyanaga et al.
(Continued)

FOREIGN PATENT DOCUMENTS

| CA | 2846472 A1 * | 3/2013 | ............ C01B 25/45 |
| WO | 2013031331 A1 | 3/2013 | |
| WO | WO 2013045905 A1 * | 4/2013 | ............ C01B 25/42 |

OTHER PUBLICATIONS

Ha et al. "Na4-αM2+α/2(P2O7)2 (2/3 ≤ α ≤ 7/8, M = Fe, Fe0.5Mn0.5, Mn): a promising sodium ion cathode for Na-ion batteries" Adv. Energy Mater., 3, 770-776 (2013).*

(Continued)

*Primary Examiner* — Harold Pyon
*Assistant Examiner* — Matthew R Diaz
(74) *Attorney, Agent, or Firm* — The Webb Law Firm

(57) ABSTRACT

Provided is a cathode active material for a secondary battery, specifically, a cathode active material for a secondary battery including sodium transition metal pyrophosphate satisfying $Na_{3.12-x2}A^c_{x1}M_1{}^a_{y1}M_2{}^b_{y2}(P_2O_7)_z$, which has an advantage of structural stability due to a strong P—O bond of sodium transition metal phosphate having an olivine structure, and also performs proper intercalation and deintercalation of Na ions having a large ion radius, thereby significantly improv- (Continued)

ing reversibility during charging and discharging, and a charge and discharge rate.

9 Claims, 6 Drawing Sheets

(51) Int. Cl.
*H01M 4/58* (2010.01)
*H01M 10/054* (2010.01)

(58) Field of Classification Search
CPC ....... C01B 25/38; C01B 25/385; C01B 25/39; C01B 25/40; C01B 25/41; C01B 25/412; C01B 25/416; C01B 25/418; C01B 25/42; C01B 25/425; C01D 13/00
See application file for complete search history.

(56) References Cited

U.S. PATENT DOCUMENTS

| | | | |
|---|---|---|---|
| 2013/0244100 A1* | 9/2013 | Tan | H01G 11/50 429/199 |
| 2014/0197358 A1 | 7/2014 | Nose | |

OTHER PUBLICATIONS

Angenault et al., "Structure of NA3.12FE2.44(P2O7)(2)", European Journal of Solid State and Inorganic Chemistry, 1995, p. 335-343, vol. 32(4) (Abstract Only).

Erragh et al., "Study of the Crystal Structures of Sodium Magnesium and Sodium Nickel Diphosphates", Journal of Solid State Chemistry, 2000, p. 323-331, vol. 152.

Hong et al., "Charge carriers in rechargeable batteries: Na ions vs. Li ions", Energy & Environmental Science, May 20, 2013, p. 2067-2081, vol. 6.

Kwang-Ho et al., "Na4-αM2+α/2(P2O7)2 (2/3:≤α≤7/8, M=Fe, Fe0.5Mn0.5, Mn): A Promising Cathode for Na-ion Batteries", Advanced Energy Materials, Jun. 2013, p. 770-776, vol. 3(6).

Marzouki et al., "Synthesis, Crystal Structure and Electrical Properties of a New Mixed Compound (Na0.71Ag0.29) 2CoP2O7", Crystal Structure Theory and Applications, 2012, p. 68-73, vol. 1.

* cited by examiner

[FIG. 1]
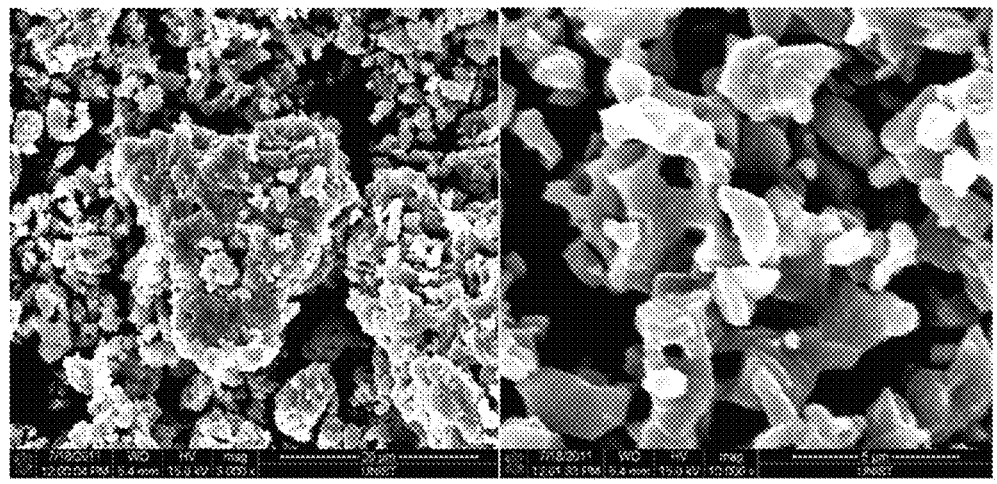
[FIG. 2]
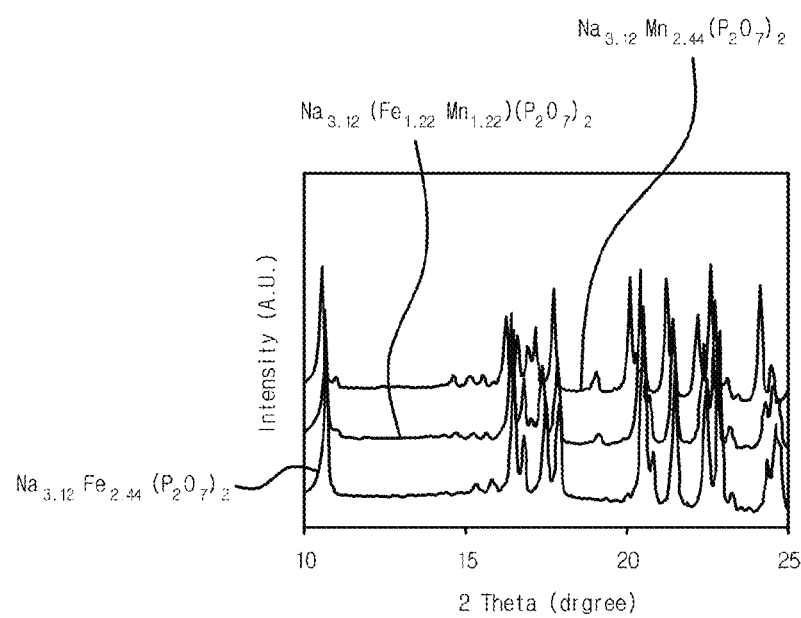

[FIG. 3]
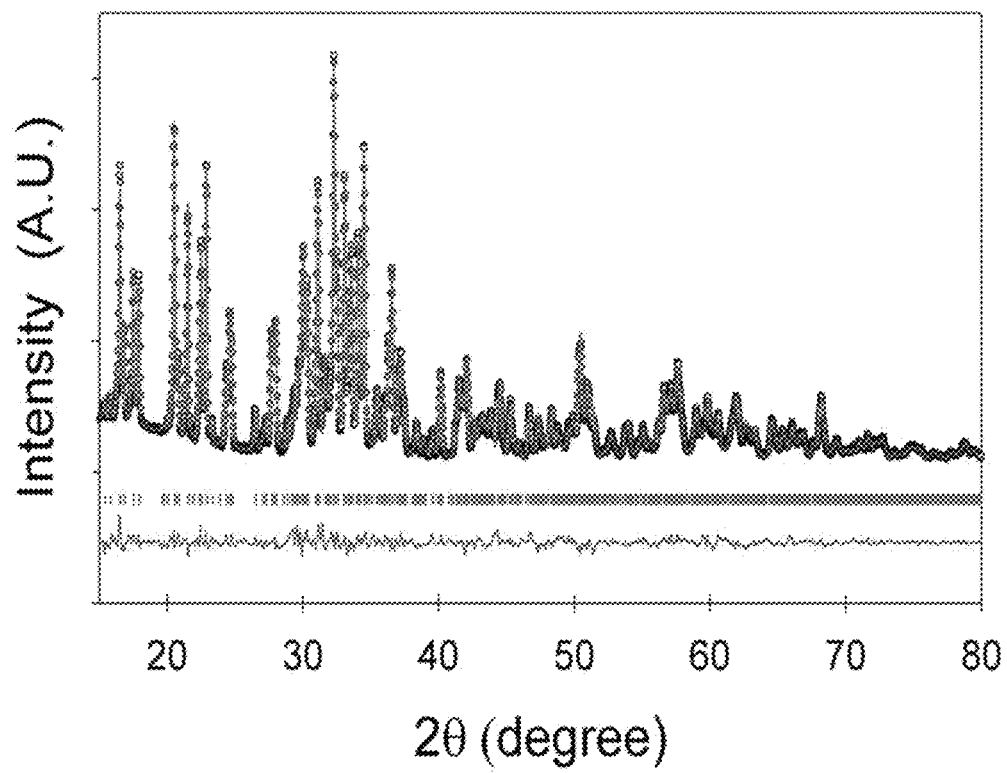
[FIG. 4]
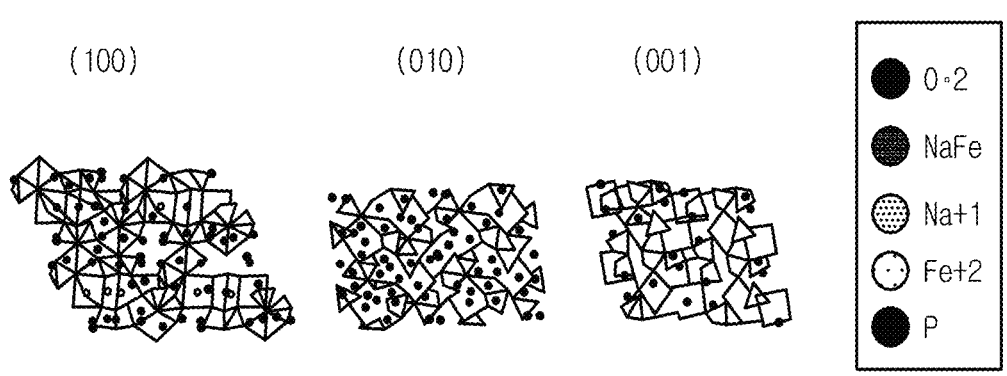

[FIG. 5]
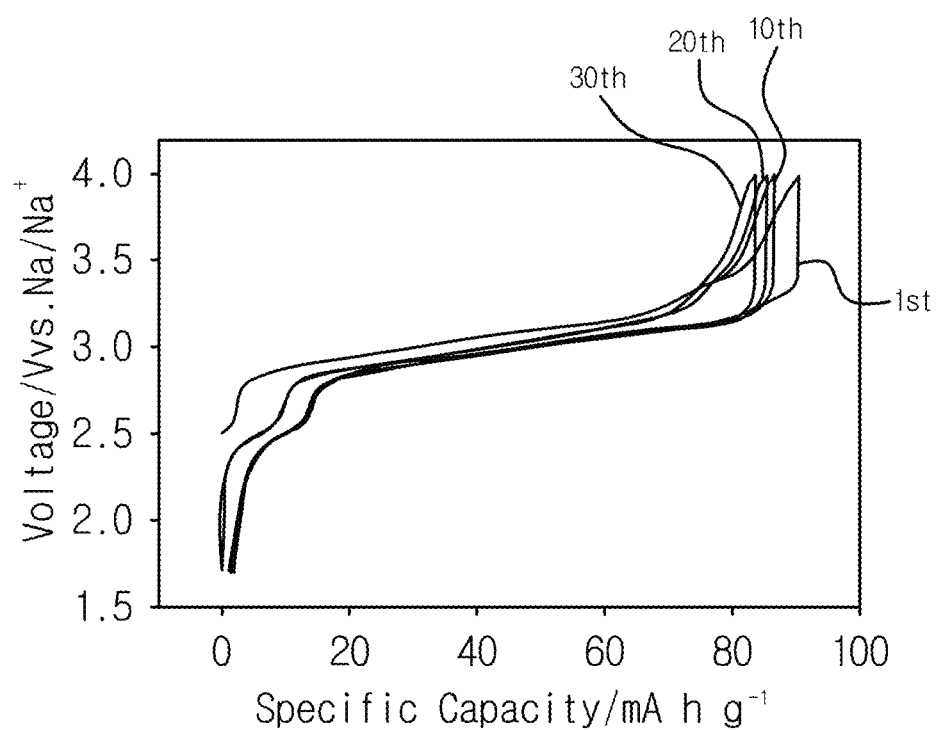

[FIG. 6]
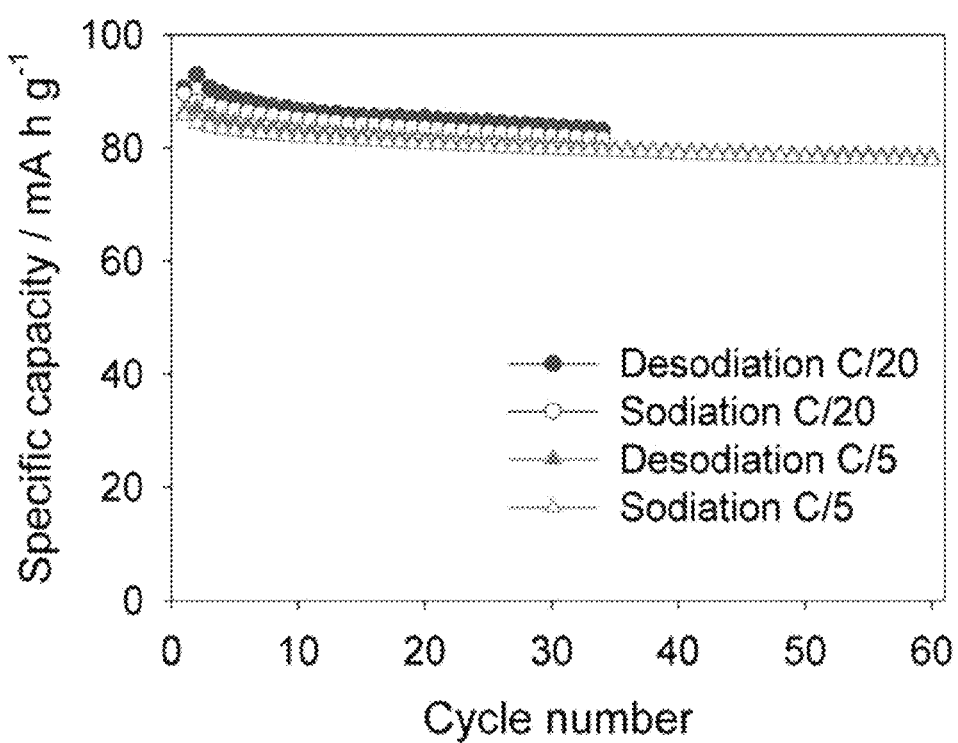

[FIG. 7]
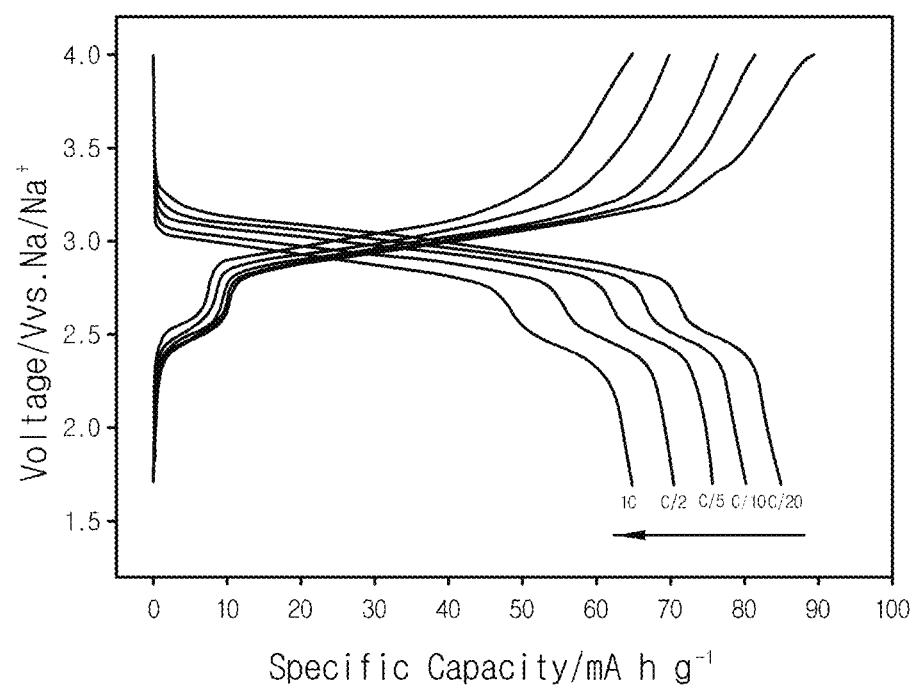

[FIG. 8]
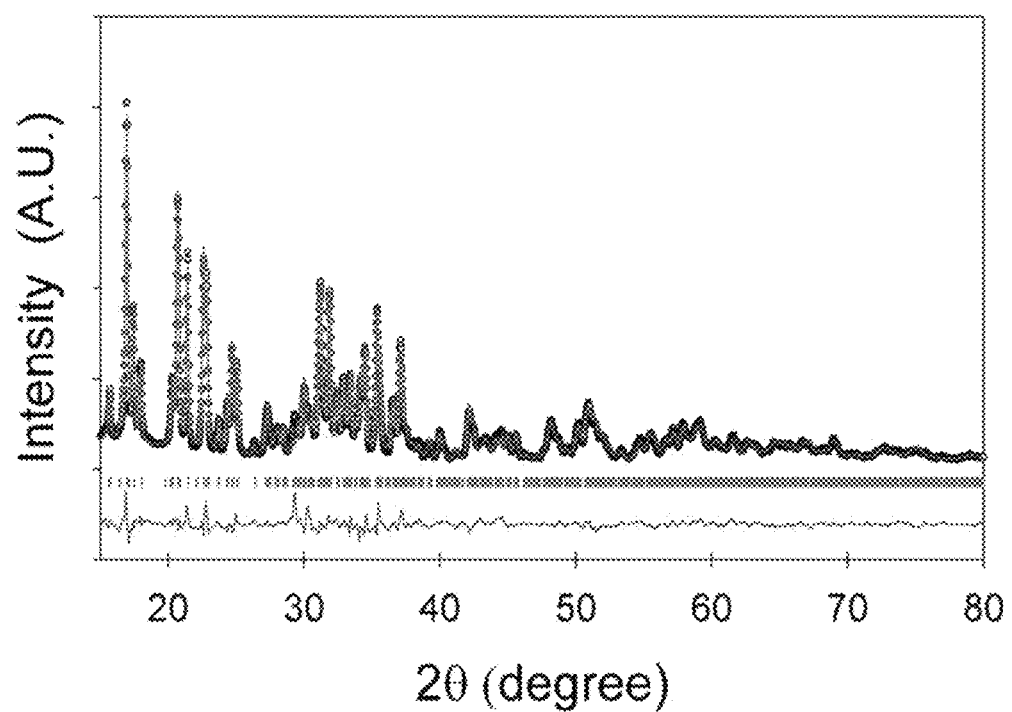

POSITIVE ELECTRODE ACTIVE MATERIAL FOR SECONDARY BATTERY

CROSS-REFERENCE TO RELATED APPLICATION

This application is the United States national phase of International Application No. PCT/KR2013/007398 filed Aug. 16, 2013, the disclosure of which is hereby incorporated in its entirety by reference.

BACKGROUND OF THE INVENTION

Technical Field

The present invention relates to a cathode active material for a secondary battery, and more particularly, to a cathode active material for a secondary battery allowing very fast ion intercalation-deintercalation in a structure.

Background Art

A phosphate-based material having an olivine structure, such as $LiFePO_4$ of a lithium ion battery which is one of the commercialized cathode materials, has excellent stability due to a strong P—O bond.

Therefore, an effort has been made to use a material of a structure similar thereto as a cathode material, also in a sodium secondary battery. Recently, as described in U.S. Patent Application Publication No. 20110008233, a technical approach has been made to utilize an olivine phosphate material such as $NaMPO_4$ (M=Fe, Co, Ni, Mn) in a sodium secondary battery. However, as a sodium ion is much larger than a lithium ion, reversible intercalation/deintercalation of sodium ions is not performed well due to the ion size, thereby generating many problems in dynamic properties (in kinetic aspects). Thus, a sodium secondary battery still does not show a satisfactory battery performance. Accordingly, development of a novel material having much more excellent dynamic properties than the existing $NaFePO_4$-based material, is currently needed.

DISCLOSURE

Technical Problem

An object of the present invention is to provide a cathode active material for a secondary battery, having excellent structural stability, and generating reversible ion intercalation and deintercalation very well, and a secondary battery having the material.

Technical Solution

In one general aspect, a cathode active material for a secondary battery includes sodium transition metal pyrophosphate satisfying the following Chemical Formula 1:

$$Na_{3.12-x2}A^c_{x1}M_{1\ y1}^{a}M_{2\ y2}^{b}(P_2O_7)_2 \quad \text{[Chemical Formula 1]}$$

wherein $A^c$ is one or two or more elements (A) selected from the group consisting of alkali metals and alkaline earth metals having a valence of c of 1 or 2; x1 is a real number of $0 \leq 1 \leq 0.5$; x2 is a product of c and x1 (x2=x1*c); $M_1^a$ is one or two or more elements ($M_1$) selected from the group consisting of transition metals and Groups 12 to 14 elements having a valence of a; $M_2^b$ is one or two or more elements ($M_2$) selected from the group consisting of transition metals and Groups 12 to 14 elements having a valence of b; a and b are identical to or different from each other, and independently of each other, an integer of 2 to 4; and y1 is a real number of $0<y1\leq2.44$, and y2 is a real number of $0\leq y2\leq2.44$.

The sodium transition metal pyrophosphate may be a triclinic phase.

The sodium transition metal pyrophosphate may be a P-1 space group.

The sodium transition metal pyrophosphate may satisfy (y1*a)+(y2*b)=4.88 in the Chemical Formula 1.

$M_1$ and $M_2$ of the sodium transition metal pyrophosphate may be, independently of each other, one or two or more elements selected from the group consisting of Co, Ni, Fe, Mn, V, Cu, Ti, Al, Cr, Mo and Nb.

A of the sodium transition metal pyrophosphate may be one or two or more elements selected from the group consisting of Li, Mg and Ca.

The sodium transition metal pyrophosphate may contain at least iron (Fe), manganese (Mn), or iron and manganese.

The cathode active material for a secondary battery may have a capacity of 80 mAh/g or more under a charge/discharge condition of 1.7V/4.0V and 0.05 C.

The cathode active material for a secondary battery may be for a sodium secondary battery.

The cathode active material for a secondary battery may further include carbon.

In another general aspect, a sodium secondary battery includes the cathode active material as described above.

Advantageous Effects

As the cathode active material for a secondary battery according to the present invention contains the sodium transition metal pyrophosphate of Chemical Formula 1, it has an advantage of structural stability due to a strong P—O bond of sodium transition metal phosphate having an olivine structure, and also performs proper intercalation and deintercalation of Na ions having a large ion radius, thereby significantly improving reversibility during charging and discharging, and a charge and discharge rate.

DESCRIPTION OF DRAWINGS

FIG. 1 is scanning electron micrographs of prepared sodium iron pyrophosphate.

FIG. 2 is a graph showing the results of x-ray diffraction analysis of prepared sodium iron pyrophosphate, iron-manganese ($Fe_{1.22}Mn_{1.22}$) pyrophosphate, manganese pyrophosphate.

FIG. 3 is a graph showing the analysis of the crystal structure of prepared sodium iron pyrophosphate by Rietveld refinement using a GSAS program.

FIG. 4 is a schematic diagram illustrating the crystal structure of prepared sodium iron pyrophosphate.

FIG. 5 is a graph showing the charge and discharge characteristics of prepared sodium iron pyrophosphate secondary battery.

FIG. 6 is a graph showing a reversible capacity for the number of charge and discharge cycles of a prepared sodium iron pyrophosphate secondary battery.

FIG. 7 is a graph showing reversible capacity change (velocity characteristic) with the current density increase of a prepared sodium iron pyrophosphate secondary battery.

FIG. 8 is a graph showing the analysis of the crystal structure of prepared sodium iron pyrophosphate in a charged state by Rietveld refinement using a GSAS program.

BEST MODE

Hereinafter, the cathode active material according to the present invention will be described in detail. Herein, technical terms and scientific terms used in the present specification have the general meaning understood by those skilled in the art to which the present invention pertains unless otherwise defined, and a description for the known function and configuration unnecessarily obscuring the gist of the present invention will be omitted in the following description and the accompanying drawings.

The cathode active material for a secondary battery according to the present invention includes sodium transition metal pyrophosphate satisfying the following Chemical Formula 1:

$$Na_{3.12-x2}A^c{}_{x1}M_1{}^a{}_{y1}M_2{}^b{}_{y2}(P_2O_7)_2 \quad \text{[Chemical Formula 1]}$$

wherein $A^c$ is one or two or more elements (A) selected from the group consisting of alkali metals and alkali earth metals having a valence of c of 1 or 2; x1 is a real number of $0 \leq x \leq 0.5$; x2 is a product of c and x1 (x2=x1*c); $M^1{}_a$ is one or two or more elements ($M_1$) selected from the group consisting of transition metals and Groups 12 to 14 elements having a valence of a; $M^2{}_b$ is one or two or more elements ($M_2$) selected from the group consisting of transition metals and Groups 12 to 14 elements having a valence of b; a and b are identical to or different from each other, and independently of each other, an integer of 2 to 4; and y1 is a real number of $0<y \leq 2.44$, and y2 is a real number of $0 \leq y2 \leq 2.44$.

Hereinafter, when describing a Chemical Formula, if a valence (a, b, c) is not indicated with, like A, $M_1$ or $M_2$, such symbol without a valence (A, $M_1$ or $M_2$) refers to an element contained in the compound of Chemical Formula 1, and if a valence is indicated with, like $A^c$, $M_1{}^a$ or $M_2{}^b$, such symbol with a valence ($A^c$, $M_1{}^a$ or $M_2{}^b$) refers to an element ion in an ion state of a valence corresponding to each element, that is, a+c, +a or +b-valence element ion in the structure of the compound of Chemical Formula 1.

In the cathode active material for a secondary battery according to one exemplary embodiment of the present invention, $M_1$ and $M_2$ in Chemical Formula 1 may be an identical element with different valences from each other, or different elements with different valences from each other, respectively. In addition, $M_1$ may be one or two or more elements with a valence of a, and $M_2$ may be one or two or more elements with a valence of b.

In the cathode active material for a secondary battery according to one exemplary embodiment of the present invention, A in Chemical Formula 1 may be one or two or more selected from alkali metals except for sodium (Na) and alkali earth metals.

In the cathode active material for a secondary battery according to one exemplary embodiment of the present invention, $M_1$ or $M_2$ may contain at least a transition metal.

In the cathode active material for a secondary battery according to one exemplary embodiment of the present invention, the sodium transition metal pyrophosphate of Chemical Formula 1 may satisfy (y1*a)+(y2*b)=4.88.

In the cathode active material for a secondary battery according to one exemplary embodiment of the present invention, the transition metal may include Sc, Ti, V, Cr, Mn, Fe, Co, Ni, Cu, Zr, Nb, Mo, Tc, Ru, Th, Pd, Ag, Hf, Ta, W, Re, Os, Ir, Pt and Au, and the Groups 12 to 14 elements may include Zn, Al, Ga, In, Tl, Ge, Sn and Pb.

In the cathode active material for a secondary battery according to one exemplary embodiment of the present invention, the alkali metal may include Li, K, Rb and Cs, and the alkali earth metal may include Be, Mg, Ca, Sr and Ba.

In the cathode active material for a secondary battery according to one exemplary embodiment of the present invention, the sodium transition metal pyrophosphate of Chemical Formula 1 may have a composition of a cathode active material in a discharged state. Herein, the discharged state refers to a state in which discharge is completed at 1.7V when a sodium secondary battery having a cathode containing a cathode active material is charged and discharged at 0.05 C in a voltage range of 1.7 (discharge)-4.0V (charge) vs. Na/Na$^+$, and may include the discharged state of a first charge and discharge cycle (in an order of charge—discharge). Specifically, the sodium secondary battery performing charge and discharge cycles may include a battery using a cathode prepared by mixing the cathode active material according to the present invention, a conductive material and a binder in a weight ratio of 7:1.5:1.5, injecting a N-methyl pyrrolidone (NMP) solution thereinto to prepare a cathode active material slurry, applying the slurry on aluminum foil, and drying it in a vacuum oven at 120° C. for 10 hours, and a sodium metal as an opposite electrode, and 0.8M NaClO$_4$/(ethylenecarbonate+diethylenecarbonate, 1:1 vol·ratio) as an electrolyte.

An attempt has been made to use sodium transition metal phosphate such as NaFePO$_4$ in a cathode active material for a sodium secondary battery, but as the sodium transition metal phosphate has an olivine structure, it has a structural limitation, since in case of Na ions having a large ion radius, reversible intercalation and deintercalation of ions are not performed well. Accordingly, in case of using the sodium transition metal phosphate of an olivine structure as a cathode active material for a secondary battery, not only reversibility of a reaction, but also a charge and discharge rate are further reduced.

As the cathode active material for a sodium secondary battery according to the present invention includes the sodium transition metal pyrophosphate of Chemical Formula 1, it may have strong structural stability even in intercalation and deintercalation of ions due to a strong P—O bond, and also perform proper intercalation and deintercalation of ions having a large ion radius such as Na ions, thereby significantly improving the reversibility during charging and discharging, and the charge and discharge rate.

In the cathode active material for a secondary battery according to one exemplary embodiment of the present invention, the sodium transition metal pyrophosphate may be a triclinic phase, and have a crystal structure of a P-1 space group. With the structure, sodium transition metal pyrophosphate may have a tunnel structure in which sodium ions (Na$^+$) are smoothly moved in [100] and [010] directions.

In the cathode active material for a secondary battery according to one exemplary embodiment of the present invention, A contained in the sodium transition metal pyrophosphate may be one or two or more elements selected from the group consisting of Li, Mg and Ca. Since Li, Mg and Ca have a similar ion radius to Na, they may be substituted at the site of sodium (sodium ion) in the crystal structure of sodium transition metal pyrophosphate, and form a substitutional solid solution.

In the cathode active material for a secondary battery according to one exemplary embodiment of the present invention, $M_1$ and $M_2$ contained in the sodium transition metal pyrophosphate of Chemical Formula 1 may be, independently of each other, at least one or more selected from the group consisting of Co, Ni, Fe, Mn, V, Cu, Ti, Al, Cr, Mo and Nb. Preferably, $M_1$ and $M_2$ which are the transition metals contained in the sodium transition metal pyrophosphate of Chemical Formula 1, may be different elements from each other.

In the cathode active material for a secondary battery according to one exemplary embodiment of the present invention, $M_1$ and $M_2$ contained in the sodium transition metal pyrophosphate of Chemical Formula 1 may be independently of each other, at least one or two or more selected from the group consisting of Co, Ni, Fe and Mn, and preferably, $M_1$ and $M_2$ may be different elements from each other.

Specifically, the cathode active material for a secondary battery according to one exemplary embodiment of the present invention may include sodium transition metal pyrophosphate satisfying the following Chemical Formula 1-1:

   [Chemical Formula 1-1]

wherein $M_3^{II}$ is one or two or more elements ($M_3$) selected from the group consisting of Co, Ni, Fe, Mn, V, Cu, Ti, Al, Cr, Mo and Nb; $M_4^b$ is one or two or more elements ($M_4$) selected from the group consisting of Co, Ni, Fe, Mn, V, Cu, Ti, Al, Cr, Mo and Nb having a valence of b; b is an integer of 3 or 4; and y5=y4*b, and y5 is a natural number satisfying 0≤y5≤2.44.

As Co, Ni, Fe, Mn, V, Cu, Ti, Al, Cr, Mo and Nb have a similar ion radius to one another, they may be substituted at the site of a transition metal (e.g., Fe) in the crystal structure of sodium transition metal pyrophosphate, and form a substitutional solid solution.

Specifically, the cathode active material for a secondary battery according to one exemplary embodiment of the present invention may include sodium transition metal pyrophosphate satisfying the following Chemical Formula 1-2:

   [Chemical Formula 1-2]

wherein $M_5^{II}$ is one or two or more elements ($M_5$) selected from the group consisting of Co, Mn, Ni and Fe having a valence of 2.

As Co, Mn, Ni and Fe are all capable of an oxidation-reduction reaction electrochemically, they may participate in a charging and discharging reaction, and as they have a similar ion radius to one another, they may be substituted at the site of a transition metal (e.g., Fe) in the crystal structure of sodium transition metal pyrophosphate, and form a substitutional solid solution.

The cathode active material for a secondary battery according to one exemplary embodiment of the present invention may include particulate sodium transition metal pyrophosphate. Specifically, the cathode active material for a secondary battery may include the particulate sodium transition metal pyrophosphate having an average primary particle size of 500 nm to 10 μm. Specifically, the cathode active material for a secondary battery may include sodium transition metal pyrophosphate which is secondary particles consisting of primary particles having an average size of 10 to 500 μm.

The cathode active material for a secondary battery according to one exemplary embodiment of the present invention may further include carbon. The carbon included in the cathode active material may be any carbon used in a general secondary battery cathode active material, and as an example, include acetylene black, graphite, soft carbon or hard carbon.

In the cathode active material for a secondary battery according to one exemplary embodiment of the present invention, the sodium transition metal pyrophosphate included in the cathode active material may be in a particulate form, and a coating layer may be formed by coating carbon on the surface of particles.

In the cathode active material for a secondary battery according to one exemplary embodiment of the present invention, the cathode active material may further include 1 to 43 parts by weight of carbon, based on 100 parts by weight of sodium transition metal pyrophosphate. Herein, the carbon included in the cathode active material may be in a homogeneously mixed state with the sodium transition metal pyrophosphate, and present as a coating layer coated on the surface of sodium transition metal pyrophosphate particles.

The cathode active material for a secondary battery according to one exemplary embodiment of the present invention may have a capacity of 80 mAh/g or more under a charge/discharge condition of 1.7V/4.0V and 0.05 C to 0.2 C (current density).

The cathode active material for a secondary battery according to one exemplary embodiment of the present invention may be for a sodium secondary battery. Herein, the sodium secondary battery may be a sodium secondary battery having molten sodium as an anode, or an all solid-state sodium secondary battery.

The present invention may include a cathode for the sodium secondary battery containing the above cathode active material for a second battery.

The cathode according to one exemplary embodiment of the present invention may include the above cathode active material and a current collector, and a cathode active material layer wherein the cathode active material is applied or coated on at least one surface of the current collector, may be formed. Specifically, in order to form the cathode active material layer, a cathode active material slurry may be applied or coated on the current collector, and the cathode active material slurry may contain a dispersion medium, a binder and a conductive material which are generally used in the preparation of a secondary battery active material together with the above cathode active material.

The present invention may include a sodium secondary battery having the above cathode.

The sodium secondary battery according to one exemplary embodiment of the present invention may include an anode containing sodium, a cathode having the above cathode active material, and an electrolyte provided between the cathode and the anode, and having ion conductivity to a sodium ion.

The sodium secondary battery according to one exemplary embodiment of the present invention may include an all solid-state sodium secondary battery wherein an anode containing sodium, a cathode containing the above cathode active material, and an electrolyte are all solid, a sodium secondary battery having a liquid electrolyte, and a sodium secondary battery having a cathode electrolyte solution together with a solid electrolyte (e.g., NASICON), and if necessary, further include a separator. In case where an electrolyte solution (or liquid electrolyte) is provided, a cathode and/or an anode may be disposed within the electrolyte solution, so that sodium ions conducted from a solid electrolyte are effectively transferred to the active material.

In the sodium secondary battery according to one exemplary embodiment of the present invention, the anode may include an anode active material containing sodium, and the electrolyte may include an organic solvent containing a sodium salt. As a substantial example, the anode may be a sodium metal, the sodium salt contained in the electrolyte may include $NaAsF_6$, $NaPF_6$, $NaClO_4$, $NaB(C_6H_5)$, $NaAlCl_4$, NaBr, $NaBF_4$, or a mixture thereof, and the organic solvent may include ethylene carbonate, dimethyl carbonate, methylethyl carbonate, propylene carbonate, or a mixture thereof, but of course, the present invention is not limited to those kinds of the anode, the electrolyte, or the structure of the battery.

Hereinafter, a method of preparing the sodium transition metal pyrophosphate for a secondary battery cathode active material will be described.

The method of preparing the sodium transition metal pyrophosphate for a secondary battery cathode active material according to the present invention includes: a) mixing a sodium precursor, a metal precursor, and a phosphate precursor to prepare a precursor raw material; b) subjecting the precursor raw material to heat treatment under an inert gas atmosphere.

In the method of preparing the sodium transition metal pyrophosphate for a secondary battery cathode active material according to one exemplary embodiment of the present invention, step b) may include b1) subjecting the precursor raw material to heat treatment under an inert gas atmosphere at 200 to 400° C. to prepare a first precursor raw material; and b2) grinding the first precursor raw material; b3) subjecting the ground first precursor raw material to heat treatment under an inert gas atmosphere at 500 to 700° C. to prepare the sodium transition metal pyrophosphate. Herein, it goes without saying that a grinding step b4) to physically crush the product obtained from step b3) so as to have a suitable size as the cathode active material may be further carried out.

In the method of preparing the sodium transition metal pyrophosphate for a sodium secondary battery cathode active material according to one exemplary embodiment of the present invention, a sodium precursor may include one or two or more materials selected from the group consisting of sodium carbonate ($Na_2CO_3$), sodium acetate ($NaOCH_2CH_3$), sodium hydroxide (NaOH), and a hydrate thereof. A metal precursor may include one or two or more materials selected from the group consisting of oxalate, acetate and carbonate of the metal, and a hydrate thereof. A phosphate precursor may include one or two materials selected from the group consisting of $(NH_4)_2HPO_4$, $NH_4H_2PO_4$ and $H_3PO_4$.

In the method of preparing the sodium transition metal pyrophosphate for a sodium secondary battery cathode active material according to one exemplary embodiment of the present invention, the metal of the metal precursor may be one or two or more elements selected from transition metals and Groups 12 to 14 elements, and specifically, the transition metal may include Sc, Ti, V, Cr, Mn, Fe, Co, Ni, Cu, Zr, Nb, Mo, Tc, Ru, Th, Pd, Ag, Hf, Ta, W, Re, Os, Ir, Pt and Au, and the Groups 12 to 14 element may include Zn, Al, Ga, In, Tl, Ge, Sn and Pb. Preferably, the metal of the metal precursor may be at least one or more elements selected from the group consisting of Co, Ni, Fe, Mn, V, Cu, Ti, Al, Cr, Mo and Nb. More specifically, the metal of the metal precursor may be at least one or more selected from the group consisting of Co, Ni, Fe and Mn.

In the method of preparing the sodium transition metal pyrophosphate for a secondary battery cathode active material according to one exemplary embodiment of the present invention, in the preparation of the precursor raw material, each precursor material may be mixed so that a mole ratio of Na:metal:phosphate is 3 to 3.3:2.2 to 2.5:1.

In the method of preparing the sodium transition metal pyrophosphate for a secondary battery cathode active material according to one exemplary embodiment of the present invention, in the preparation of the precursor raw material, the precursors may be mixed by milling, and the milling may be carried out by a general method used for homogeneously mixing and grinding powder such as a ball mill, a rod mill or an attrition mill.

In the method of preparing the sodium transition metal pyrophosphate for a secondary battery cathode active material according to one exemplary embodiment of the present invention, the prepared raw material may be subjected to heat treatment under an inert gas atmosphere containing argon, helium, neon, nitrogen or a gas mixture thereof.

Specifically, after the prepared raw material is subjected to low temperature heat treatment at 200 to 400° C. under an inert gas atmosphere, the product obtained from the low temperature heat treatment may be ground, and be subjected to high temperature heat treatment at 500 to 700° C. again under the inert gas atmosphere.

In the method of preparing the sodium transition metal pyrophosphate for a secondary battery cathode active material according to one exemplary embodiment of the present invention, the sodium transition metal pyrophosphate having excellent compositional uniformity, and a primary particle size of an order of micrometers may be prepared by subjecting a precursor raw material to two-step heat treatment at low temperature and high temperature, again grinding and mixing the product obtained from the low temperature heat treatment by milling using a ball mill, a rod mill or an attrition mill, and then subjecting it to high heat treatment.

Hereinafter, the present invention will be illustrated by the following Examples and Preparation Examples. However, the Examples and Preparation Examples are merely provided in order to more clearly understand the present invention, and are not intended to limit the scope of the present invention. The present invention will be defined within the scope of the technical idea of the claims described later.

Preparation Example 1

Preparation of Sodium Iron Pyrophosphate 1.06 g of $Na_2CO_3$, 1.8 g of $FeC_2O_4 \cdot 2H_2O$, and 2.64 g of $(NH_4)_2HPO_4$ were mixed and ball-milled, and then subjected to heat treatment at 300° C. for 6 hours under an argon gas atmosphere (primary heat treatment). The raw material subjected to the primary heat treatment was ball-milled to be mixed again, and then subjected to heat treatment at 600° C. for 6 hours under an argon gas atmosphere again (secondary heat treatment) to prepare sodium iron pyrophosphate.

Preparation Example 2

Preparation of Sodium Manganese Iron Pyrophosphate 1.06 g of $Na_2CO_3$, 0.9 g of $FeC_2O_4 \cdot 2H_2O$, 0.9 g of $MnC_2O_4 \cdot 2H_2O$, and 2.64 g of $(NH_4)_2HPO_4$ were mixed and ball-milled, and then subjected to heat treatment at 300° C. for 6 hours under an argon gas atmosphere (primary heat treatment). The raw material subjected to the primary heat treatment was ball-milled to be mixed again, and then subjected to heat treatment at 600° C. for 6 hours under an argon gas atmosphere again (secondary heat treatment) to prepare sodium manganese iron pyrophosphate.

Preparation Example 3

Preparation of Sodium Manganese Pyrophosphate 1.06 g of $Na_2CO_3$, 1.8 g of $MnC_2O_{4.2}H_2O$ and 2.64 g of $(NH_4)_2HPO_4$ were mixed and ball-milled, and then subjected to heat treatment at 300° C. for 6 hours under an argon gas atmosphere (primary heat treatment). The raw material subjected to the primary heat treatment was ball-milled to be mixed again, and then subjected to heat treatment at 600° C. for 6 hours under an argon gas atmosphere again (secondary heat treatment) to prepare sodium manganese pyrophosphate.

Preparation Example 4

Preparation of Sodium Secondary Battery

Sodium transition metal pyrophosphate prepared in Preparation Example 1, 2 or 3: a conductive material (carbon black (Super P)): a binder (PVdF; Polyvinylidene fluoride) were mixed in a weight ratio of 7:1.5:1.5, a N-methyl pyrrolidone (NMP) solution was used to prepare a slurry, and then the thus prepared slurry was applied on aluminum foil, and dried in a vacuum oven at 120° C. for 10 hours to prepare a cathode. In addition to the cathode prepared in a glove box, a sodium metal as an opposite electrode, and ethylenecarbonate/diethylenecarbonate (volume ratio 1/1) containing 0.8M NaClO4 as an electrolyte were used to manufacture a battery.

The manufactured sodium secondary battery was charged and discharged at 0.05 C and 0.2 C in a voltage range of 1.7V (discharging)-4.0V (charging) vs. Na/Na$^+$. The charge and discharge cycle proceeded in an order of charge-discharge.

FIG. 1 is a scanning electron micrograph of the sodium iron pyrophosphate prepared in Preparation Example 1, wherein the left one is a low magnification micrograph, and the right one is a high magnification micrograph. As seen from FIG. 1, it is confirmed that sodium iron pyrophosphate as secondary particles formed by agglomerating primary particles having a size of several μm, was prepared.

FIG. 2 is a graph showing the results of x-ray diffraction analysis of sodium transition metal pyrophosphate prepared in Preparation Examples 1 to 3, and as seen from FIG. 2, it is confirmed that $Na_{3.12}Fe_{2.44}(P_2O_7)_2$, in Preparation Example 1, $Na_{3.12}(Fe_{1.22}Mn_{1.22})(P_2O_7)_2$ in Preparation Example 2, and $Na_{3.12}Mn_{2.44}(P_2O_7)_2$ in Preparation Example 3 which are a triclinic phase, were prepared. FIG. 3 shows the results of a structure simulation (GSAS Rietveld refinement) based on the measured composition and the structure according to the x-ray diffraction results, and it was recognized that the prepared sodium transition metal pyrophosphate is a P-1 space group, and as shown in FIG. 4, it was also recognized that a large channel is formed in [100] and [010] directions to provide intercalation/deintercalation passages of sodium ions having a large ion radius.

FIG. 5 shows the results of evaluating the charge and discharge characteristic of the sodium secondary battery of Preparation Example 4, containing the sodium iron pyrophosphate prepared in the Preparation Example 1 as a cathode active material, wherein the charge and discharge were performed at 0.05 C in a voltage range of 1.7V (discharging)-4.0V (charging) vs. Na/Na$^+$. As seen from the results of FIG. 5, it is recognized that in the first charge/discharge, sodium ions contained in sodium iron pyrophosphate are deintercalated immediately after preparation, and then a reversible intercalation/deintercalation reaction of sodium ions to intercalate sodium ions proceeds upon discharging, wherein a reversible capacity is about 85 mAh/g.

FIG. 6 is a graph summarizing and showing a reversible capacity of the sodium secondary battery of Preparation Example 4 containing the sodium iron pyrophosphate prepared in Preparation Example 1 as a cathode active material, for the number of charge and discharge cycles, wherein the charge and discharge were performed at 0.05 C (C/20 of FIG. 6) and 0.2 C (C/5 of FIG. 6) in a voltage range of 1.7V (discharging)-4.0V (charging) vs. Na/Na$^+$. As seen from FIG. 6, it is recognized that reversible intercalation and deintercalation of sodium ions are performed well, a stable charge and discharge characteristic is maintained until the 60th cycles, and in the charge and discharge cycle, 2 Na$^+$s are reversibly intercalated/deintercalated in a sodium iron pyrophosphate structure.

FIG. 7 is a graph showing reversible capacity change with the current density of 1 C (1 C of FIG. 7) to 0.05 C (C/20 of FIG. 7) of the sodium secondary battery of Preparation Example 4 containing the prepared sodium iron pyrophosphate prepared in Preparation Example 1 as a cathode active material. As seen from FIG. 7, it is recognized that a reversible capacity was 80 mAhg$^{-1}$ or more even at the current density of 0.1 C (C/10 of FIG. 7), and a reversible capacity of 65 mAhg$^{-1}$ or more was maintained even at the current density of 1 C (1 C of FIG. 7).

FIG. 8 is a graph showing the analysis of the crystal structure of sodium iron pyrophosphate in a charged state by Rietveld refinement using a GSAS program, in order to confirm whether there is structural change, and as seen from the results of Rietveld refinement crystal structure analysis of the cathode active material in a charged state in FIG. 9, a triclinic structure was maintained even upon intercalation or deintercalation of sodium ions.

Hereinabove, although the present invention has been described by specific matters, exemplary embodiments, and drawings, they have been provided only for assisting in the entire understanding of the present invention. Therefore, the present invention is not limited to the exemplary embodiments. Various modifications and changes may be made by those skilled in the art to which the present invention pertains from this description.

Therefore, the spirit of the present invention should not be limited to the above-described exemplary embodiments, and the following claims as well as all modified equally or equivalently to the claims are intended to fall within the scope and spirit of the invention.

The invention claimed is:

1. A sodium secondary battery comprising as a cathode a cathode active material comprising a sodium metal pyrophosphate having a triclinic phase and a P-1 space group and satisfying the following Chemical Formula 1:

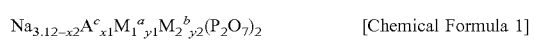

$$Na_{3.12-x2}A^c{}_{x1}M_1{}^a{}_{y1}M_2{}^b{}_{y2}(P_2O_7)_2 \quad \text{[Chemical Formula 1]}$$

wherein $A^c$ is one or more elements (A) selected from the group consisting of alkali metals and alkali earth metals having a valence of c of 1 or 2; x1 is a real number of 0≤x1≤0.5; x2 is a product of c and x1 (x2=x1*c); $M_1{}^a$ is one or more elements ($M_1$) selected from the group consisting of transition metals and Groups 12 to 14 elements having a valence of a; $M_2{}^b$ is one or more elements ($M_2$) selected from the group consisting of transition metals and Groups 12 to 14 elements having a valence of b; a and b are identical to or different from each other, and independently of each other, an integer of 2 to 4; and y1 is a real number of $0<y1 \leq 2.44$, and y2 is a real number of $0 \leq y2 \leq 2.44$.

2. The sodium secondary battery of claim 1, wherein the sodium metal pyrophosphate satisfies $(y1*a)+(y2*b)=4.88$ in the Chemical Formula 1.

3. The sodium secondary battery of claim 1, wherein M1 and M2 are independently of each other, one or more elements selected from the group consisting of Co, Ni, Fe, Mn, V, Cu, Ti, Al, Cr, Mo and Nb.

4. The secondary battery active of claim 3, wherein A is one or more elements selected from the group consisting of Li, Na, Mg and Ca.

5. The secondary battery active of claim 1, wherein the sodium metal pyrophosphate contains at least iron (Fe), manganese (Mn), or iron and manganese.

6. The sodium secondary battery of claim 1, wherein the cathode active material has a capacity of 80 mAh/g or more under a charge and discharge condition of 1.7V/4.0V and 0.05 C.

7. The secondary battery active of claim 1, wherein the cathode active material further comprises carbon.

8. The secondary battery active of claim 2, wherein the cathode active material further comprises carbon.

9. The secondary battery active of claim 1, wherein the sodium metal pyrophosphate satisfies the following Chemical Formula 2:

$$Na_{3.12}M_5^{II}{}_{2.44}(P_2O_7)_2$$

wherein $M_5^{II}$ is one or more elements ($M_5$) selected from the group consisting of Co, Mn, Ni and Fe and having a valence of 2.

* * * * *

UNITED STATES PATENT AND TRADEMARK OFFICE
CERTIFICATE OF CORRECTION

PATENT NO. : 10,026,520 B2
APPLICATION NO. : 14/904237
DATED : July 17, 2018
INVENTOR(S) : Jeong Soo Kim et al.

Page 1 of 1

It is certified that error appears in the above-identified patent and that said Letters Patent is hereby corrected as shown below:

On the Title Page

Column 2, Item (57) ABSTRACT, Line 4, delete "$(P_2O_7)_z$," and insert -- $(P_2O_7)_2$, --

In the Claims

Column 10, Line 54, Claim 1, after "as" delete "a cathode"

Column 11, Line 13, Claim 4, after "The" insert -- sodium --

Column 11, Line 13, Claim 4, after "battery" delete "active"

Column 11, Line 16, Claim 5, after "The" insert -- sodium --

Column 11, Line 16, Claim 5, after "battery" delete "active"

Column 12, Line 5, Claim 7, after "The" insert -- sodium --

Column 12, Line 5, Claim 7, after "battery" delete "active"

Column 12, Line 7, Claim 8, after "The" insert -- sodium --

Column 12, Line 7, Claim 8, after "battery" delete "active"

Column 12, Line 9, Claim 9, after "The" insert -- sodium --

Column 12, Line 9, Claim 9, after "battery" delete "active"

Signed and Sealed this
Fifteenth Day of January, 2019

Andrei Iancu
*Director of the United States Patent and Trademark Office*